United States Patent
Tymoshenko et al.

(10) Patent No.: US 9,031,988 B2
(45) Date of Patent: May 12, 2015

(54) AUTOMATIC WEBSITE GENERATOR

(71) Applicant: Site Technologies Inc., Toronto (CA)

(72) Inventors: Oles Tymoshenko, Ajax (CA); Stephen Curry, Ajax (CA)

(73) Assignee: Site Technologies Inc., Toronto (CA)

( * ) Notice: Subject to any disclaimer, the term of this patent is extended or adjusted under 35 U.S.C. 154(b) by 0 days.

(21) Appl. No.: 13/675,834

(22) Filed: Nov. 13, 2012

(65) Prior Publication Data

US 2013/0167009 A1   Jun. 27, 2013

Related U.S. Application Data

(63) Continuation of application No. 12/063,947, filed as application No. PCT/CA2006/001339 on Aug. 16, 2006, now Pat. No. 8,335,799.

(60) Provisional application No. 60/708,759, filed on Aug. 17, 2005.

(51) Int. Cl.
*G06F 17/30* (2006.01)
*G06F 17/22* (2006.01)

(52) U.S. Cl.
CPC ........ *G06F 17/3089* (2013.01); *G06F 17/2247* (2013.01); *G06F 17/30887* (2013.01)

(58) Field of Classification Search
CPC ....................................................... G06F 17/30
USPC ................................................. 707/600–899
See application file for complete search history.

(56) References Cited

U.S. PATENT DOCUMENTS

| | | | |
|---|---|---|---|
| 5,940,834 A | 8/1999 | Pinard et al. | |
| 6,684,369 B1 * | 1/2004 | Bernardo et al. | 715/205 |
| 8,595,046 B1 * | 11/2013 | Christian | 705/7.18 |
| 2002/0105545 A1 | 8/2002 | Carter et al. | |
| 2004/0015476 A1 | 1/2004 | Twaddle | |
| 2004/0123244 A1 | 6/2004 | Campbell et al. | |
| 2004/0268238 A1 * | 12/2004 | Liu et al. | 715/513 |
| 2005/0091282 A1 | 4/2005 | Whitfield | |
| 2005/0131859 A1 | 6/2005 | Li | |
| 2005/0222861 A1 | 10/2005 | Silverman et al. | |
| 2006/0212804 A1 | 9/2006 | Jackson et al. | |

OTHER PUBLICATIONS

Office Action issued by the European Patent Office; Dated: Nov. 5, 2010; for co-pending European Patent Application No. 06775114.9; Applicant: Wideport.Com Inc.
International Search Report for related application PCT/CA2006/001339 mailed on Feb. 28, 2008.
International Preliminary Report on Patentability for related application PCT/CA2006/01339 mailed on Feb. 28, 2008.

\* cited by examiner

*Primary Examiner* — Isaac M Woo
(74) *Attorney, Agent, or Firm* — Pepper Hamilton LLP

(57) ABSTRACT

A system and method for the automatic generation of a website. The website is created upon a user request, where the user provides identification information that is used to search an information database. The information will provide a reference to a code that relates to a template that is used to specify the layout, style and content of the website that is to be generated, and the website is then generated in accordance with the structure of the template, based on content contained in the information database. The user may engage the system and method by means of e-mail or a dedicated website or other such suitable means.

6 Claims, 8 Drawing Sheets

| Company Name Field | Address Field | Telephone Number Field | Company Information Field | Industry Code Field | Contact Person Field | Fax Number Field | Email Address Field | Other Information Field |
|---|---|---|---|---|---|---|---|---|
| ⋮ ⋮ ⋮ | ⋮ ⋮ ⋮ | ⋮ ⋮ ⋮ | ⋮ ⋮ ⋮ | ⋮ ⋮ ⋮ | ⋮ ⋮ ⋮ | ⋮ ⋮ ⋮ | ⋮ ⋮ ⋮ | ⋮ ⋮ ⋮ |

FIG. 2

| Industry Code Field 150 | Keywords Field 155 | Template Field 160 |
|---|---|---|
| ⋮ | ⋮ | ⋮ |
|  | ⋮ | ⋮ |
|  | ⋮ | ⋮ |
| ⋮ | ⋮ | ⋮ |
|  | ⋮ | ⋮ |
| ⋮ | ⋮ | ⋮ |

AUTOMATIC WEBSITE GENERATOR

FIELD OF THE INVENTION

The invention relates to a system and method for website generation. More specifically, the invention relates to a system and method for automatically generating websites.

BACKGROUND OF THE INVENTION

With the ever-increasing proliferation of communication devices and methods to access the Internet, a growing number of people make use of the Internet on a daily basis. Recent statistics indicate that close to 900,000,000 people have Internet access in 2005. According to some estimates, this represents a 146% increase from 2000. As more and more people gain access to the Internet, the Internet has become an invaluable tool for those who wish to market their businesses.

Companies or businesses that have a website are able to penetrate a market beyond their local geographic area, as the website is easily accessible worldwide. A website allows a business to provide a potential customer with information pertaining to their business including the place of business, hours, goods and/or services offered.

A website for a business provides a very simple and effective means to promote their business to an increasing number of people. The Internet has become a tool of first resort for many when researching a business (including the name, address, and business hours).

Establishing a website is often a difficult task for small businesses. Individuals who do not have experience with creating websites and publishing information on the Internet will typically find it difficult to design and publish their own website. Typically, most business owners do not have the technical skills required to establish and maintain a website. Also, a great deal of knowledge and effort is required to ensure that the website is aesthetically pleasing to view. As a result, a great deal of time and effort, or expenditure is involved in order to establish even a simple website.

As a result of the difficulty and potential costs associated with establishing a website, many software applications are available that help a user create a website. These programs require the user to select borders and colors and other style and design elements, as well as specifying the information that they wish to publish on the particular website. Although such programs assist a user in developing a website, a considerable amount of judgment and know how, along with the writing of the content, is still required on the part of the user in order to develop a website with these applications.

As a result of the difficulty and time involved with software applications that aid users in building websites, various tools are available on the Internet which purport to allow for the 'automatic' creation of websites. These tools require the user to select from various styles and layouts of templates that will be used to build their website. These automatic webpage builders also require the user to provide the content they wish to appear on the website. While these automatic webpage builders do simplify the process by which websites are built, they still require a great deal of user interaction involving the layout of the website and the specification of content that is to appear on the website. Also, these builders do not take into account the type of business or enterprise that is related to the business, and as such, the websites that have been created are very generic in nature, as they are not customized for the particular type of business.

SUMMARY OF THE INVENTION

The present invention provides a method and system for the automatic generation of websites. Websites are generated for users who engage the system and request a website to be generated by providing at least one piece of identification information. The identification information may relate to the address, name, telephone number, or any other such identifiers. The identification information is provided by the user through various means, including entering the information on a website, including it as part of a URL, providing it in an e-mail, or providing it over the phone. Once the identification information has been received, an information database is searched to determine whether the identification information is found within the database. The information database may be stored upon or accessible to a server that receives the request for a website to be generated. The information database will specify an industry code or other classification mechanism for each record contained in the information database, which will specify the type of industry that the particular record is associated with. For each industry code that is used, one or more website templates will have been defined, and stored upon the server. The website template contains one or more webpages and specifies the layout and type of content that is to appear on a website. If the identification information is located in the information database, the respective website template is retrieved and the record from the information database containing the identification information is also retrieved and used to populate the website template. The population of the website template results in the creation of a website, which is then shown to the user for their review, where the user is able to modify the website that has been automatically created, and where the user may choose to publish the website on the Internet.

BRIEF DESCRIPTION OF THE DRAWINGS

For a better understanding of the invention and to show more clearly how it may be carried into effect, reference will now be made, by way of example only, to the accompanying drawings which show at least one exemplary embodiment of the invention and in which:

FIG. 2 is a diagram illustrating the fields contained within an exemplary embodiment of an information database;

FIG. 3 is a diagram illustrating the fields contained within a exemplary embodiment of a template database;

DETAILED DESCRIPTION OF THE INVENTION

Figure 1:
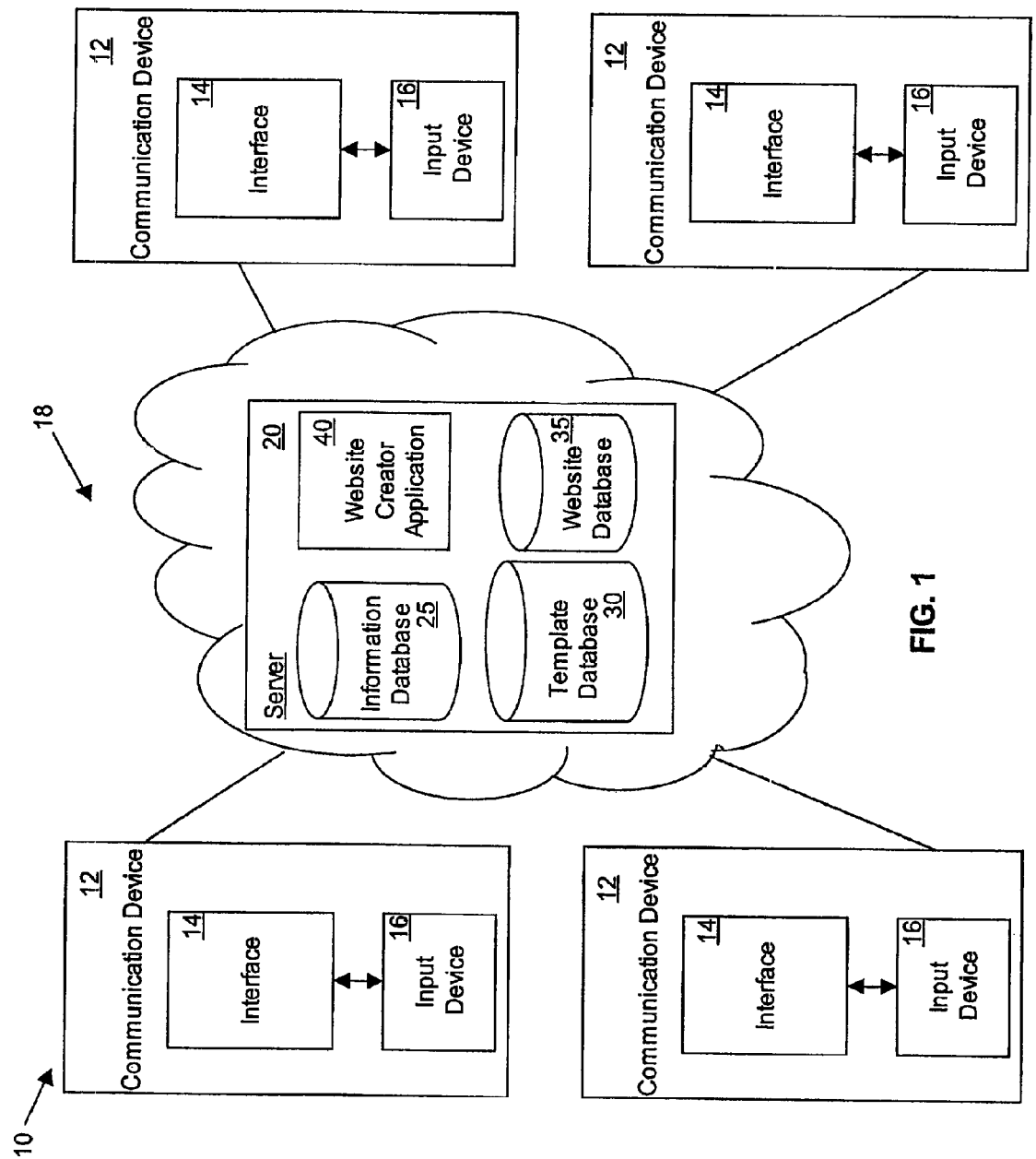
FIG. 1 is a block diagram of the components of the website generator system.

Reference is made to FIG. 1, where components of a website generator system 10 are shown in one exemplary embodiment. The system 10 includes one or more communication devices 12, that communicate with one or more servers 20 through a network 18. The communication device 12 is able to communicate with the communication network 18 through various means, including any combination of modems, routers, local area networks (LAN), wide area networks (WAN), phone lines, or any other communication systems or devices. The communication network 18 may be the Internet, or any other communication system or means through which data can be communicated from a communication device 12.

The communication device 12 in an exemplary embodiment includes an interface 14 and an input means 16. Examples of communication devices 12 include, but are not limited to, personal desktop computers, work station computers, server computers, laptops, mobile/handheld computers, wireless e-mail devices, phones or any other such device that is able to connect to a network. The interface 14 is typically a graphical display device such as a monitor, and includes any means by which text may be displayed or communicated to a user. The input means 16 allow for alphanumeric character entry.

The server 20 is a server type computer. The server 20 is connected to the communication network 18. The system 10, in this exemplary embodiment, has been described with reference to one server 20, however, it should be noted that one or more servers 20 may be employed in the system 10. The server 20, has resident upon it, or accessible to it, a website generation software application. The term website refers to a collection of one or more web pages, which may optionally be linked together using hypertext or other links. The term web page refers to data including graphical or text information.

The server 20, in one exemplary embodiment, has stored upon it, or accessible to it, an information database 25, a template database 30, a website database 35, and a website creator application 40.

Reference is now made to FIG. 2, which illustrates the information database 25 in further detail. In system 10, the information database 25 is used to store data relating to business entities. Each business entity has a record in the information database 25. Each entry in the information database 25 includes fields corresponding to a directory listing for a business or other entity. In an exemplary embodiment, each record includes a company name field 100, an address field 105, a telephone number field 110, a company information field 115, an industry code field 120, a contact person field 125, a fax number field 130, an email address field 135, and an other information field 140. In this exemplary embodiment, each entry in the information database 25 includes information similar to a "yellow pages" directory listing. It is not necessary that each record contain data for every particular field.

The fields are used to record information about each business as described in the table below.

| Field | Contents |
| --- | --- |
| Company name field 100 | The name of the business. |
| Address field 105 | The street address of the business. |
| Telephone number field 110 | The telephone number of the business. |
| Company information field 115 | A description of the product or services offered by the business. |
| Industry code field 120 | Industry classification code describing the products or services offered by the business. |
| Contact person field 125 | The name of the contact for the business. |
| Fax number field 130 | The fax number of the business. |
| Email address field 135 | The email address associated with the business. |
| Other information field 140 | May store any other information with respect to the entry. |

The data in the industry code field 120 may be based on one or more standardized business activity classification systems. For example, one such system is the Standard Industrial Classification (SIC), which has been developed to classify businesses according to the activities they are engaged in. The SIC was designed to cover the entire field of business activities by defining industries in accordance with the composition and structure of the economy. The SIC employs a four digit code that is used to identify the primary activity a business is engaged in. Recently, due to changes in the economy, other industry classification systems have been introduced to deal with the increasing number of areas or sectors that businesses may be engaged in. For example, the North American Industry Classification System (NAICS), is a six digit code that allows for classifications to be assigned for businesses that are taking part in newer industries. It should be understood, that SIC and NAICS are only two examples of industry classification systems that may be used in the website generation system 10, as any classification system that allows for entries to be grouped by category may be used. Therefore, depending on the industry classification system that is being employed, the industry code field 120 contain codes representative of the sector to which the business relates. The operator of a system according to the present invention may define and use its own industry code system or any other suitable classification method.

The information database 25 in an exemplary embodiment must contain for each record, information from the industry code field 120, and information from at least one field from among the company name field 100, the address field 105, the telephone number field 110, the fax number field 130, or the email address field 135. The information database 25 may include records for businesses located in one or more geographic regions.

The information database 25 may have its records for each business populated by various means. In one embodiment, the information for the records may be received directly from the businesses, in another embodiment the information may be manually compiled, or received from third parties.

In another embodiment, the information database 25 may include records relating to individuals or other entities or to any combination of entities. This exemplary embodiment has been described with reference to websites being generated for businesses, however, it should be noted that as the information database 25 may be used to store records for various types of entities, websites may therefore be automatically generated for non-business entities. When the information database 25 contains records other than business entries, other suitable classification systems may be used to specify relations between templates and records in the information database 25.

All of the records in the information database 25 may be managed by an administrator. Alternatively, a business or other entity may be permitted to edit its own record in the information database 25. The information database 25 may be managed by others including sales agents, third party agents, or any other suitable individual, or any combination of these.

Reference is made to FIG. 3, which illustrates the fields of an exemplary embodiment of a template reference database 30. In an exemplary embodiment, the template reference database 30 comprises an industry code field 150, a keyword field 155 and a template information field 160.

The industry code field 150 contains listings of all the codes that are associated with the particular industry classification system that is used in the web page generation system 10. Each industry code entry may reference one or more sets of keywords as contained in the keywords field 155. The template information field 160 contains for each entry in the industry code field 150, a reference to one or more website templates. The keywords field 155 may contain for each industry code, one or more sets of keywords, which would allow for more specific templates to be associated with the particular industry code. For example, if the industry code relates to automobile sales then sets of keywords may be associated with particular makes of automobiles, which would then allow less generic templates to be used when generating a website. The template information field 160 contain for each entry in the industry code field 150, a reference to one or more website templates. The fields of the template database 30 are used to record information about each business as described in the table below.

| Field | Contents |
|---|---|
| Industry code field 150 | Listing of all the codes for the industry classification system that is used. |
| Keyword field 155 | A reference to various keywords which may be associated with a particular template. |
| Template information field 160 | A reference to one or more website templates that are associated with the particular industry code. |

In the website generation system 10, one or more website templates are defined. The website templates correspond to different types of websites that may be generated. The website templates allow websites to be generated which may be comprised of text, fields, graphics, images, formulas, scripts, HTML code, Java Script, Flash Pages, Flash Animation and any other functionality. One or more website templates may be designed for each industry code that is employed in the industry classification system, or one website template may be associated with more than one industry code. The website templates are designed to relate to the particular industry code they correspond with. For example, website templates may have associated with them graphics or pictures that relate to the particular class of goods and or services associated with the particular industry code. In the website generation system 10, website templates are customized for the various industry codes that are employed. In one exemplary embodiment, website templates are comprised of HTML codes and graphic images.

Figure 4A:
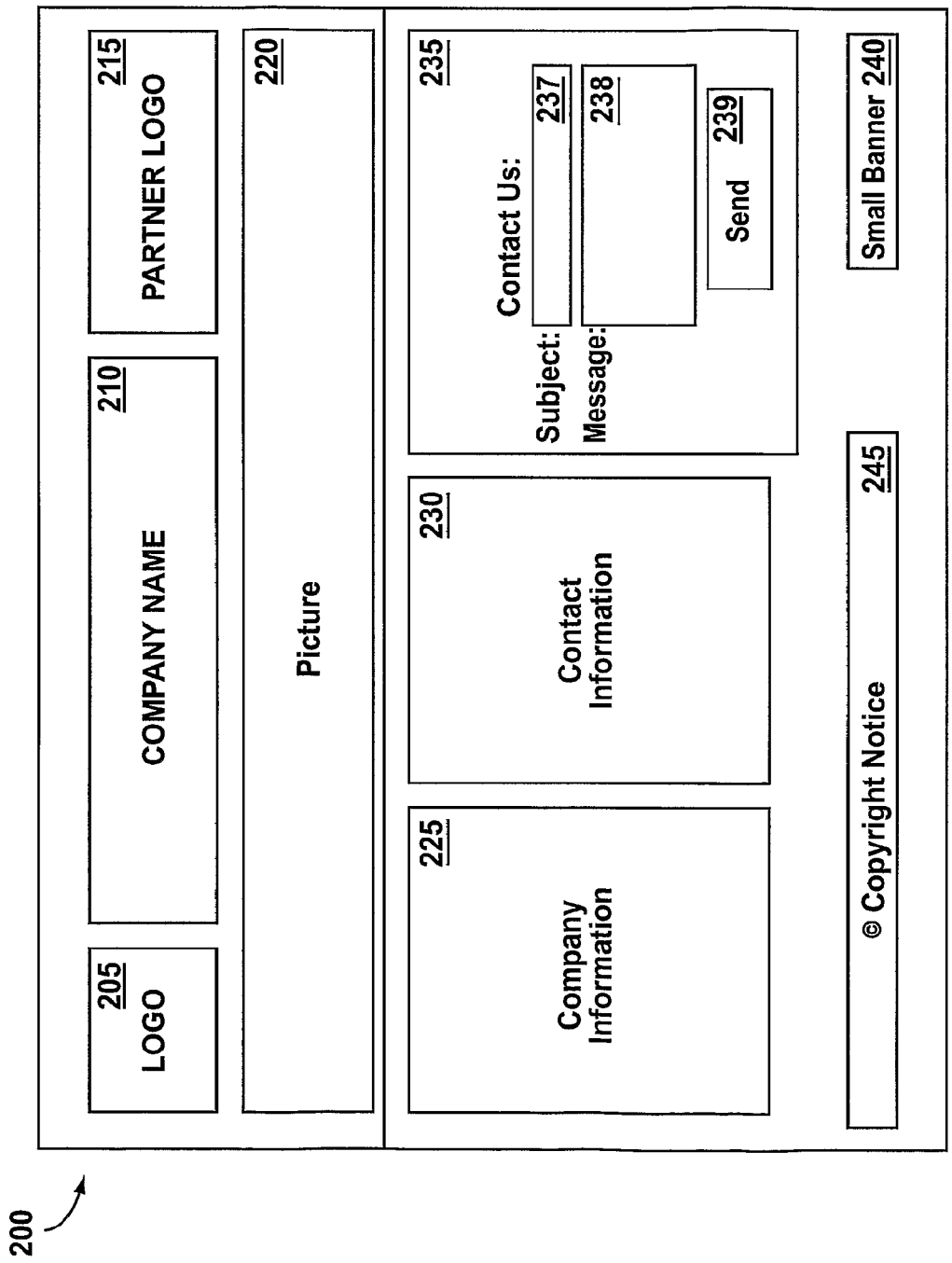
FIG. 4A is a diagram of one exemplary embodiment of a template used to generated websites.
Figure 4B:
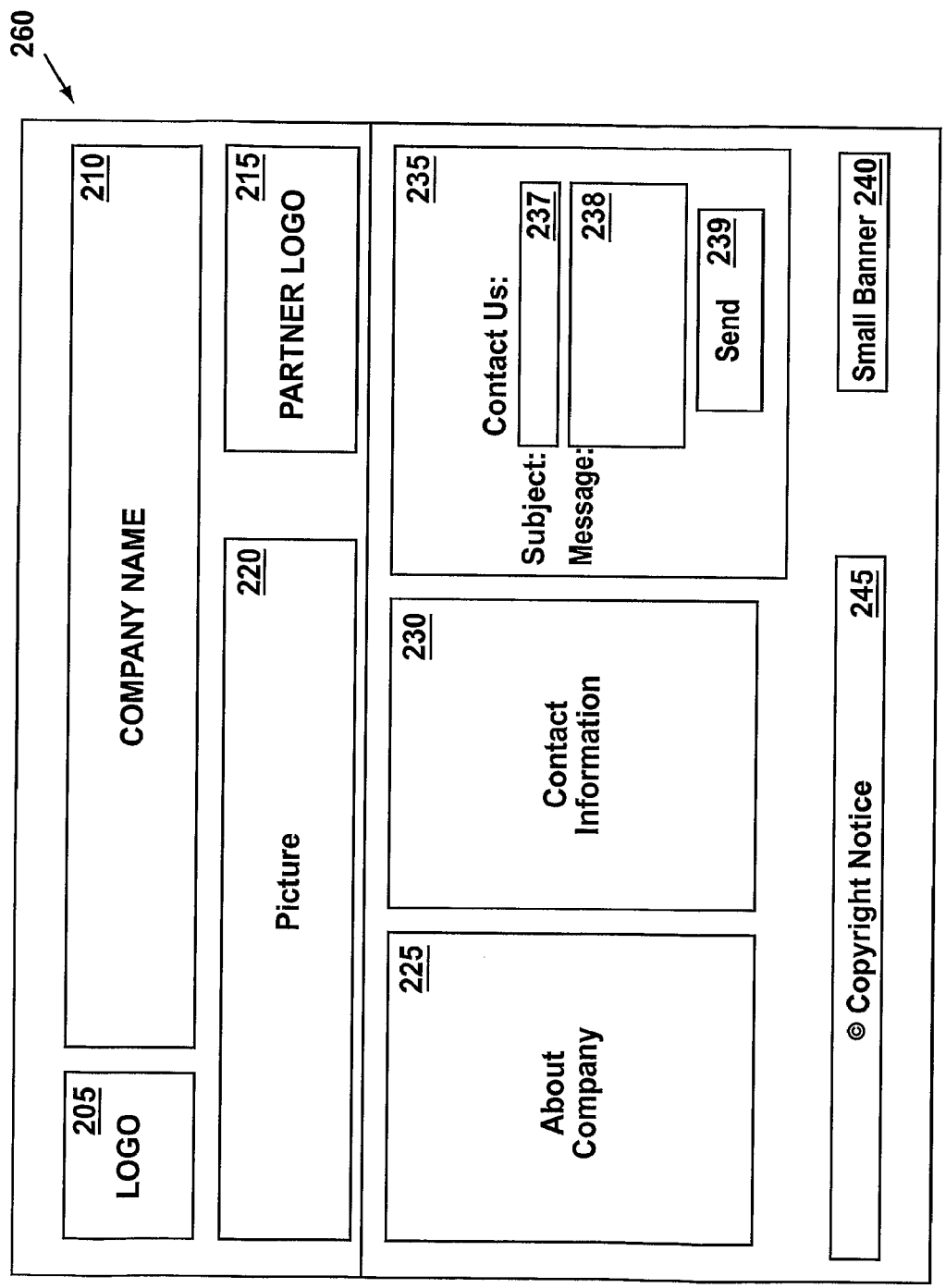
FIG. 4B is a diagram of another exemplary embodiment of a template used to generate websites.
Figure 4C:
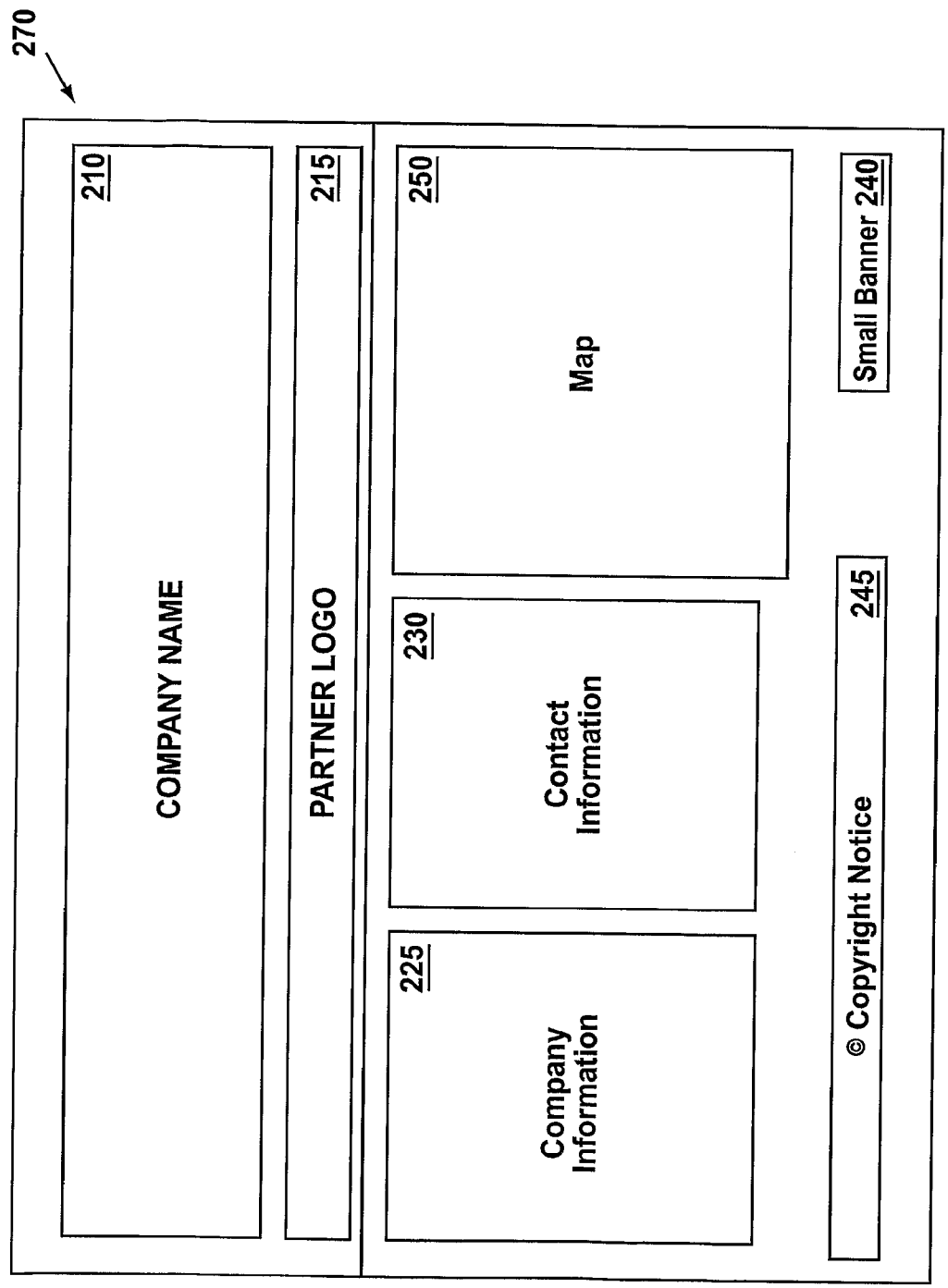
FIG. 4C is a diagram of another exemplary embodiment of a template used to generate websites.

Reference is now made to FIGS. 4A, 4B and 4C, where exemplary embodiments of website templates are shown in greater detail. FIG. 4A, FIG. 4B and FIG. 4C all illustrate embodiments of one page website templates. The website templates may be comprised of one or more webpages. With respect to FIG. 4A, a website template 200 comprises a logo field 205, a company name field 210, a partner logo field 215, a picture field 220, a company information field 225, a contact information field 230, a contact business field 235, a banner field 240, and a copyright notice field 245.

The logo field 205 allows for a logo, or other graphical image that is associated with the business to be displayed. The company name field 210 allows the business name to be displayed on the website. The partner logo field 215 is used to display the logos of any other entity with which the business is associated. For example, some businesses on their websites place information with respect to the credit card brands they are affiliated with (i.e. Visa™, Mastercard™, American Express™). The picture field 220 may be used for a picture or graphic that is associated with the business. The company information field 225 provides a description of the goods and/or services that are offered by the particular business. The contact information field 230 may contain, if applicable, any of the following information: the place of business, the telephone number, e-mail address, hours of operation, the contact person and any other information that allows for contact to be made with the business. The contact field 235 may comprise a script that is executed to allow for a user of a website to enter a message they wish to be sent to the business. Specifically, if a website that has been generated includes a contact field 235, a user is able to send a message to the business by specifying an optional subject in a subject field 237, writing the message in the message field 238, and then sending the message by clicking on a send icon 239. The user is able to enter any message they desire and upon the user sending the message, the message is transmitted to the business. The message may be transmitted to the business by means of an e-mail, based on an e-mail address that is associated with the business as stored in the email address field 135 of the information database 25. The banner field 240 is used to display upon the website banner type advertising. A copyright notice field 245 displays a copyright notice which states that the content that is displayed on the website is protected by copyright and is owned by the business or other entity with which the website is associated.

Reference is now made to FIG. 4B, where another exemplary embodiment of a website template is shown. The website template 260 shown in FIG. 4B has a different layout of the fields than were shown in FIG. 4A. Reference is now made to FIG. 4C, where another embodiment of a website template is shown. The website template 270 as shown in FIG. 4C, has the same fields as were shown in FIGS. 4A and 4B respectively, with the exception of the logo field 205. The website template 270 in FIG. 4C also contains a picture/map field 250. The picture/map field 250 is used to provide either a graphical image or picture that is to be associated with the business, or a map that provides directions to the place of business. The website templates that have been described herein, have been described for purposes of example only, as the templates may contain various fields and functionality, as well as multiple links to the other websites and web pages.

Figure 5:
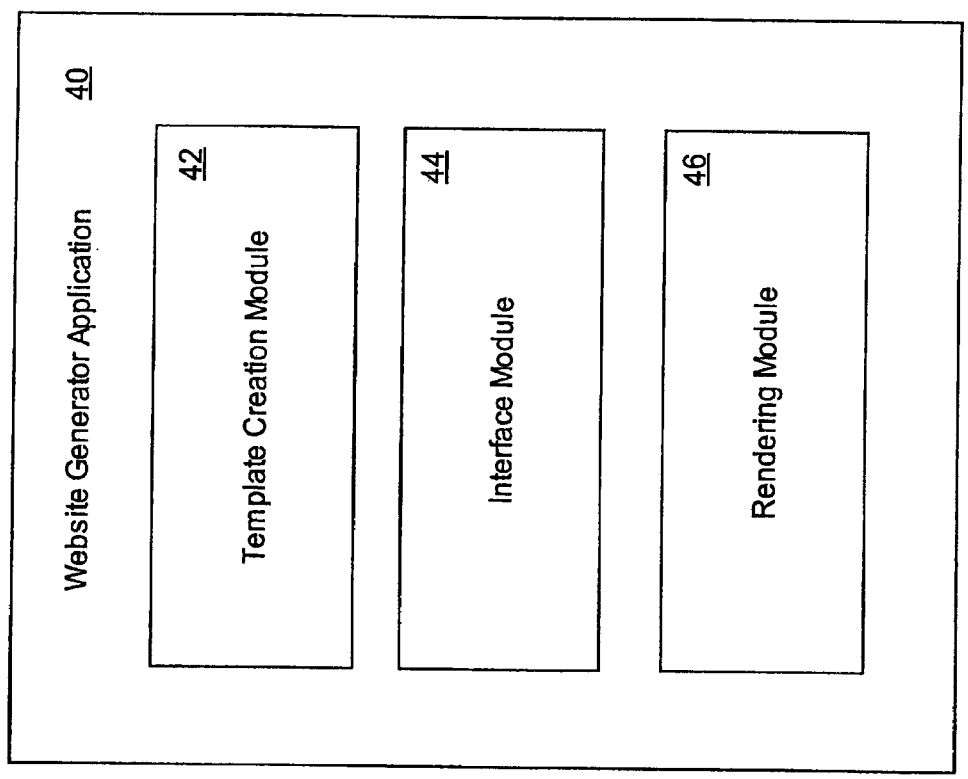
FIG. 5 is a diagram illustrating the constituent components of the website generator application.

The website generation system 10, has installed upon or accessible to the server 20, a website generator application 40. Reference is made to FIG. 5, where the constituent components of the website generator application 40 are shown. The website generator application 40 in one exemplary embodiment, is comprised of a template creation module 42, an interface module 44 and a rendering module 46. The template creation module 42, allows for website templates, examples of which have been shown with respect to FIG. 4A-4C to be created, and stored upon the server 20. The interface module 44, receives the request for a website to be generated and the information required to generate the website. The rendering module 46 receives input from the interface module 44, and accesses the information database 25 and the template database 35, and generates a website.

Figure 6:
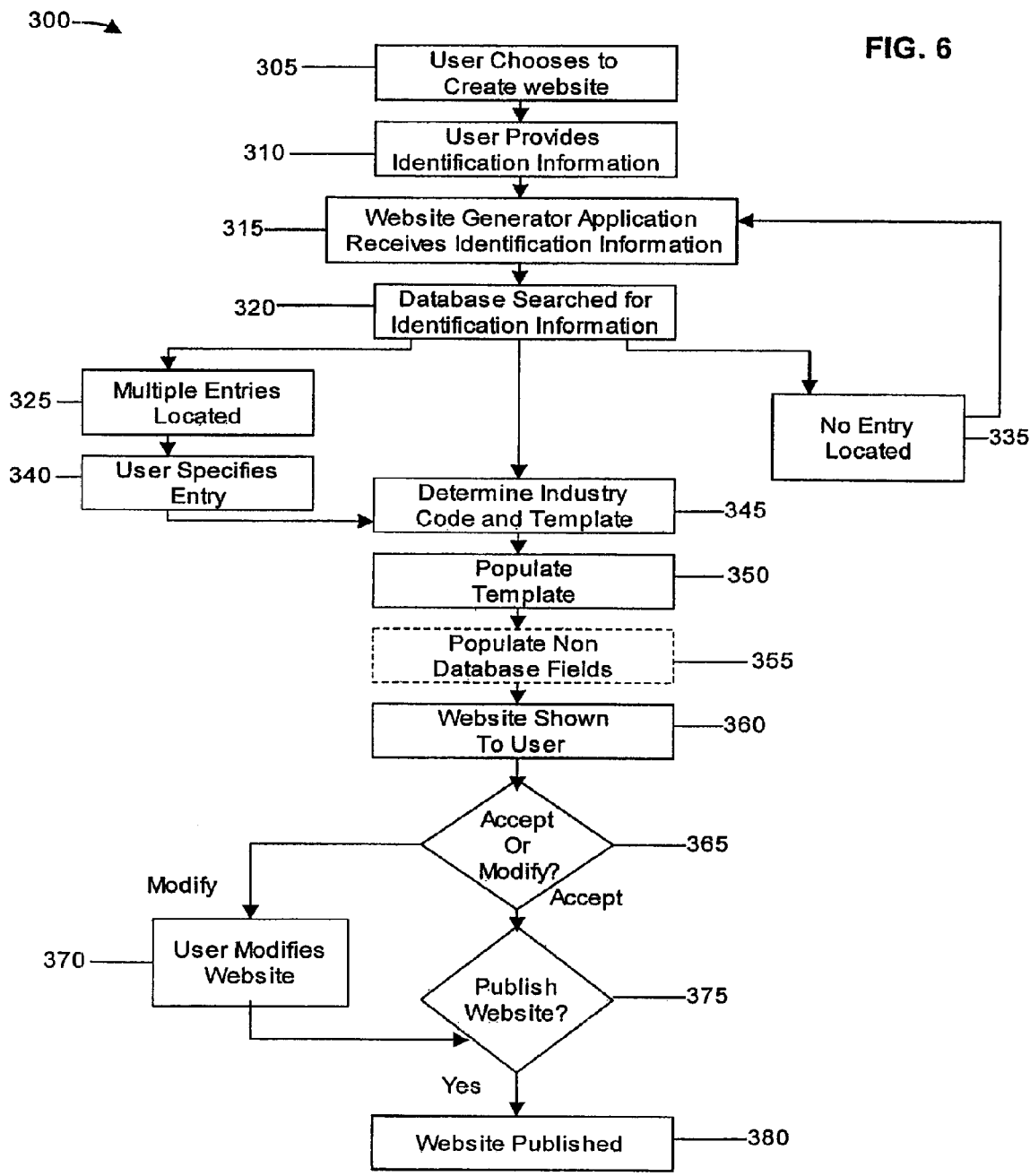
FIG. 6 is a flowchart illustrating the steps of a website generator method.

Reference is now made to FIG. 6, where the steps of a website generation method 300 are shown. The website generation method 300 when undertaken results in the automatic creation of a website. This embodiment of the website generation method 300 is described with respect to the creation of websites for businesses. However, as has been described, the website generation method 300 may be used to generate websites for non-business entities. The website generation method 300, may be used to automatically generate websites where the information for the website is found in a database, similar to the information database 25, and can be accessed by the website generator application 40. A user who wishes to engage the website generation system 10 to automatically generate a website, will do so through using a communication device 12, which is able to communicate with the server 20 by means of a communication network 18.

Website generation method 300 begins at step 305. At step 305, the user accesses system 10 and chooses to create a website. The user accesses the system 10 in one embodiment by visiting a website. The method as described here may be engaged by visiting a website that provides the website generation functionality. Alternatively, the user may access the system 10 by means of sending an e-mail, to an e-mail address that is associated with the automatic website generation method 300. The system 10 of the present invention, may also be accessed by other means, such as through use of a phone, and calling a specific phone number.

Method 300 then proceeds to step 310, where the user provides identification information. The user provides to the server 20, any one piece of information, which is unique to the business such as the business name, the address, the telephone number, fax number, email address or any other such information. Information that may be unique to the business, is referred to as identification information. This identification information is provided to the website generator application 40, and more specifically the interface module 44, through various means, including entry of the information on a website, sending the identification information in an e-mail as the subject line, in the text body, or providing the identification information over the phone through key entry and automated voice prompts. In an exemplary embodiment, if the user is engaging the website generation method by means of a website, the user may enter the identification information as part of the URL (Uniform Resource Locator) address. For example, if the identifier associated with a business is the phone number, i.e. 555-555-1212, the URL may be entered as www.domain.com/5555551212. The identifier may be combined with the URL and the method may be engaged in this manner. Alternatively, the website may contain functionality, where the identification information may be entered on the website. Upon the user providing at least one piece of identification information, method 300 proceeds to step 315. Depending on the communication device the user chooses to engage the system with, steps 305 and 310 may be combined. As an example, where the user engages the method by using email, the user sends the message to the specified email address containing the identifier information in one email. Also, when the user engages the method by means of the website, where the identified information is included as part of a URL, the identifier information is entered as part of a URL that is associated with the method. Therefore, by entering a website address (that contains the identifier information) the method automatically generates a website.

At step 315, the website generator application 40 receives the identification information and provides the identification information as an input parameter to the rendering module 46.

Method 300 then proceeds to step 320, where the information database 25 is searched to determine whether any record contains the identification information that was provided by the user. If the identification information that has been provided is not unique, method 300 then proceeds to step 325. If the search of the information database 25 returns one unique entry that contains the identification information, method 300 then proceeds to step 345. If the search of the information database 25 does not return any entries that match the identification information, then method 300 proceeds to step 335.

If at step 320, multiple entries containing the identification information were located, method 300 then proceeds to step 325, where the list of multiple entries are communicated to the user. The user is then asked to select the entry from among the list of multiple entries presented for which they wish the website to be created. The user then selects the entry they wish a website to be created for at step 340, and method 300 then proceeds to step 345.

Method 300 proceeds to step 335, if it is determined that no entries were located that correspond with the identification information provided by the user. At step 335, the user is presented with the option of providing additional identification information that would allow the information database 25 to be searched again.

If at step 320, one unique entry was located in the information database 25, method 300 proceeds to step 345. At step 345, the information database 25 is accessed, and more specifically the industry code field 120 is accessed to determine the industry code that is associated with the particular entry. The industry code field 120 for the particular entry provides to the rendering module 46, the industry code that is associated with the industrial classification system that is employed. The industry code associated with the particular entry is then used to search the template database 30. The template database 30 as described above, specifies for each industry code used in the particular industrial classification system, a website template to be used when generating the website. At step 345, the template database is searched to determine the appropriate template that is to be used, as is indicated by information provided in the template information field 155

Method 300 then proceeds to step 350, where the template is populated based on information contained in the information database 25. The data required to populate the fields of the template is extracted from the information database 25. Based on the fields contained in the specific template that is being employed, data is retrieved from the information database 25. Upon the population of the respective template fields with information from the information database 25, method 300 may proceed to optional step 355.

Method 300 then proceeds to step 355, if there remain template fields to be populated that require information from other than the information database 25. Step 355 is used to populate template fields where required, that do not require further information from the user, such as the automatic generation of maps, or a counter mechanism which tracks the number of hits on a website for example. A map may be generated by the rendering module 46 by making use of the address as found in the information database 25, and providing that information to a map creation service such as those that are available on the Internet (i.e. mapquest™). Upon the completion of optional step 355, or step 350 if step 355 has not been required, a website will have been generated, where the user has been required to provide only one piece of unique identification information to generate the entire website.

Method 300 then proceeds to step 360, where the website that has been generated is shown to the user. In step 360, the generated website will be sent to the user. The generated website may be sent to the user through various means, including as images of the webpages that comprise the website, or as a link to a URL that hosts the created website. The URL that is provided to the user may be a dedicated URL, or a temporary URL that is used to allow the user to view the website that has been created Upon the user being shown the website in step 360, the user is presented with various options in step 365. At step 365, the user may chose to either accept the website as has been generated, or to modify the website that has been created. If the user selects the option of modifying the website, method 300 proceeds to step 370. If the user accepts the content and layout of the website, method 300 proceeds to step 375.

If at step 365, the user selects the option of modifying the website that has been generated, the user is provided a URL, wherein functionality is present to allow modifications to the generated website. For example, the user is able to insert and or edit text, change background colors, fonts and font sizes, graphics/pictures, and links to other websites. Upon the user completing any modification of the generated website, method 300 proceeds to step 375.

Method 300 proceeds to step 375, when the user at step 365 does not require modifications to be made, or where at step 370 modifications have been made to the website. At step 375, the user is presented with the option of having the website published on the Internet. If the user chooses to have the website published, method 300 proceeds to step 380 wherein the generated website is published. At step 375, the user is also presented with the option of having the website published on a specific domain that is specified by the user, registering a specific domain name, or for the generated website to be published on a domain associated with the server. If the user selects to have the generated website published, the website generator application 40 then causes the generated website to be published on the Internet.

In alternative embodiments of method 300, the user may be provided with the option of selecting between multiple templates presented to them, before the website is generated. Also, in alternative embodiments, website generation method 300 may be engaged by means of a phone, where a user requests the generation of a website by means of phone commands in response to voice prompts.

It should be understood that the various modifications can be made to the embodiments described and illustrated herein, without departing from the invention, the scope of which is defined in the appended claims.

The invention claimed is:

1. A method for automatically generating a website, the method comprising:
   (a) receiving, at a server, a request to generate the website, the request comprising at least one unique identifier; and
   (b) operating at least one processor to generate the website; the at least one processor being in communication with the server and configured to:
       (i) identify at least one website template from a plurality of website templates stored in a storage module based on the request; and
       (ii) populate one or more template fields of the at least one website template with data associated with the at least one unique identifier;
   wherein operating the at least one processor to generate the website further comprises:
   associating each website template in the plurality of website templates with at least one classification code from a plurality of classification codes, each classification code of the plurality of classification codes corresponds to a different category;
   determining a classification code corresponding to the request and
   identifying the at least one website template by selecting one or more website templates associated with the classification code.

2. The method of claim 1, wherein determining a classification code corresponding to the request comprises:
   locating at least one data entry in the storage module based on the request, the storage module comprises a plurality of data entries; and
   retrieving the classification code from the at least one data entry.

3. The method of claim 1, wherein the plurality of classification codes is associated with a classification system and the classification system allows for each template to be grouped by at least one category.

4. The method of claim 3, wherein operating the at least one processor to generate the website further comprises defining the classification system.

5. The method of claim 3, wherein the classification system is selected from the group consisting of a Standard Industrial Classification (SIC) System and a North American Industry Classification System.

6. A method for the automatic generation of a website, the method comprising:
   receiving from a communication device a request to generate a website and one or more identification information;
   searching an information database comprising one or more entries for a particular entry containing the identification information, each of the one or more entries comprising a classification code for grouping entries in the information database by category, and each classification code referencing one or more website templates;
   determining the website template to be used for generating the website based on the classification code included in the particular entry in the information database containing the identification information; and
   populating one or more template fields of the website template with information from the particular entry in the information database containing the identification information to generate the website.

* * * * *